(12) United States Patent
Hsu

(10) Patent No.: US 6,999,309 B2
(45) Date of Patent: Feb. 14, 2006

(54) GUIDE TRACK DEVICE OF DISK DRIVE

(75) Inventor: Hark Hsu, Taoyuan Hsien (TW)

(73) Assignee: Casetek International Co., Ltd., Taoyuan Hsien (TW)

( * ) Notice: Subject to any disclaimer, the term of this patent is extended or adjusted under 35 U.S.C. 154(b) by 107 days.

(21) Appl. No.: 10/795,822

(22) Filed: Mar. 9, 2004

(65) Prior Publication Data

US 2005/0007732 A1    Jan. 13, 2005

(51) Int. Cl.
*H05K 7/10*    (2006.01)
*H05K 5/02*    (2006.01)

(52) U.S. Cl. .................... 361/685; 361/683; 312/223.1

(58) Field of Classification Search ................ 361/683, 361/685, 802; 369/75.11; 312/223.1, 223.2, 312/223.32, 334.1, 349
See application file for complete search history.

(56) References Cited

U.S. PATENT DOCUMENTS

| | | | | |
|---|---|---|---|---|
| 5,142,447 A | * | 8/1992 | Cooke et al. ............... | 361/685 |
| 5,262,923 A | * | 11/1993 | Batta et al. ................ | 361/685 |
| 6,288,902 B1 | * | 9/2001 | Kim et al. .................. | 361/725 |
| 6,388,875 B1 | * | 5/2002 | Chen .......................... | 361/685 |
| 6,396,686 B1 | * | 5/2002 | Liu et al. .................... | 361/685 |
| 6,442,020 B1 | * | 8/2002 | Liu et al. .................... | 361/683 |
| 6,442,031 B1 | * | 8/2002 | Liu ............................ | 361/727 |
| 6,511,139 B2 | * | 1/2003 | Liu ......................... | 312/223.2 |
| 6,590,775 B2 | * | 7/2003 | Chen .......................... | 361/725 |
| 6,853,549 B2 | * | 2/2005 | Xu ............................. | 361/685 |
| 6,882,526 B2 | * | 4/2005 | Neukam et al. ............ | 361/685 |
| 2004/0075978 A1 | * | 4/2004 | Chen et al. ................. | 361/685 |
| 2005/0155050 A1 | * | 7/2005 | Tucker et al. ............... | 720/654 |

* cited by examiner

*Primary Examiner*—Anatoly Vortman
*Assistant Examiner*—Ingrid Wright

(57) ABSTRACT

A guide track device of a disk drive is installed at two sides of a disk drive; and then the guide tracks are installed at two slide grooves at a pair of machine frame of a computer casing so as to position the disk drive or pull and push the disk drive. Each guide track device comprises two convex cambered elastomers at two sides. A conductive elastic sheet is a cambered plate and has two hooks. By the two hooks, the conductive elastic sheet are buckled into the two windows. By inserting a plurality of tenons into the holes at lateral sides of a disk drive, the pair of guide tracks are positioned to the disk drive. An ear is at a front end of each guide track. By pulling or pushing the ears, the disk drive can be pull out from or push into the machine frame.

5 Claims, 8 Drawing Sheets

GUIDE TRACK DEVICE OF DISK DRIVE

FIELD OF THE INVENTION

The present invention relates to disk drives, and particular to a guide track device of a disk drive, by the present invention, the installation of a disk drive can be simplified. Furthermore, the pulling or pushing operation of the disk drive from a computer casing is easy and convenient. In the present invention, the disk drive is an optical disk drive or a floppy disk drive.

BACKGROUND OF THE INVENTION

Generally, the computer casing has a machine frame for installing a disk drive, for example, an optical disk drive or a floppy disk drive. The disk drive is locked to the machine frame. However, it has the problem for locking a disk drive to the machine frame, that is, it is inconvenient to lock or unlock the disk drive.

In one improvement, with reference to FIGS. 7 and 8, the frame of sliding track 5 includes a body 51 and a hook 52. A conductive pin 511 and a hole 512 are formed on a bottom of the body 51. One end of the body 51 has a plurality of blocks 513 having cambered surface. When pressing the hook 52 into the body 51, the hook 52 can be buckled to be below the blocks 513. A conductive hooking unit 521 of the hook 52 dose not protrude out of the hole 512 of the body 51. The conductive pin 511 of the body 51 of the sliding track 5 and the conductive hooking unit 521 of the hook 52 are embedded into the pin holes of a disk drive (not shown). In above structure, since the hook 52 presses upon the body 51, and is confined by the blocks 513. Meanwhile, the conductive hooking unit 521 of the hook 52 protrudes out of the hole 512 of the body 51 to be buckled to the disk drive. Since the positioning of the hook 52 and body 51 is not preferred, when pulling the front end of the hook 52 to drive the disk drive, the hook 52 is loosened from the body 51 so that the conductive pin 511 and the conductive hooking unit 521 break. Thereby, the guide track is easily destroyed. Moreover, it is often that the gaps between the disk drive and the machine frame are too larger or too small so that the assembly is too loose or even they cannot be assembled.

SUMMARY OF THE INVENTION

Accordingly, the primary object of the present invention is to provide a guide track device of a disk drive; by the present invention, the installation of a disk drive can be simplified. Furthermore, the pulling or pushing operation of the disk drive from a computer casing is easy and convenient. In the present invention, the disk drive is an optical disk drive or a floppy disk drive.

To achieve above objects, the present invention provides a guide track device of a disk drive, which is installed at two sides of a disk drive; and then the guide tracks are installed at two slide grooves at a pair of machine frame of a computer casing so as to position the disk drive or pull and push the disk drive. Each guide track device comprises two convex cambered elastomers at two sides. A conductive elastic sheet is a cambered plate and has two hooks. By the two hooks, the conductive elastic sheet is buckled into the two windows. By inserting a plurality of tenons into the holes at lateral sides of a disk drive, the pair of guide tracks are positioned to the disk drive. An ear is at a front end of each guide track. By pulling or pushing the ears, the disk drive can be pull out from or push into the machine frame.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
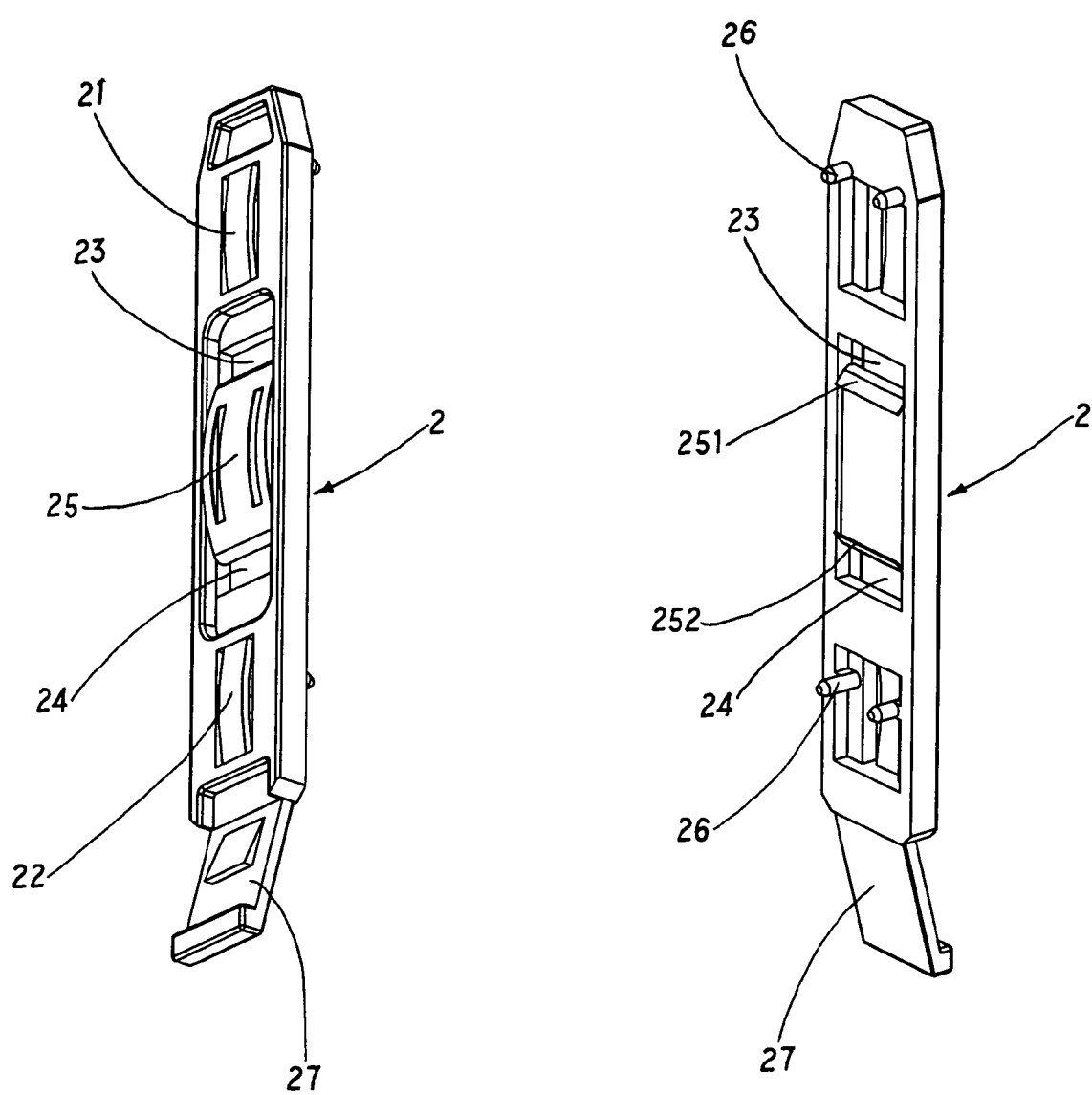
FIG. 1 is a perspective view of the first embodiment of the present invention.
Figure 2:
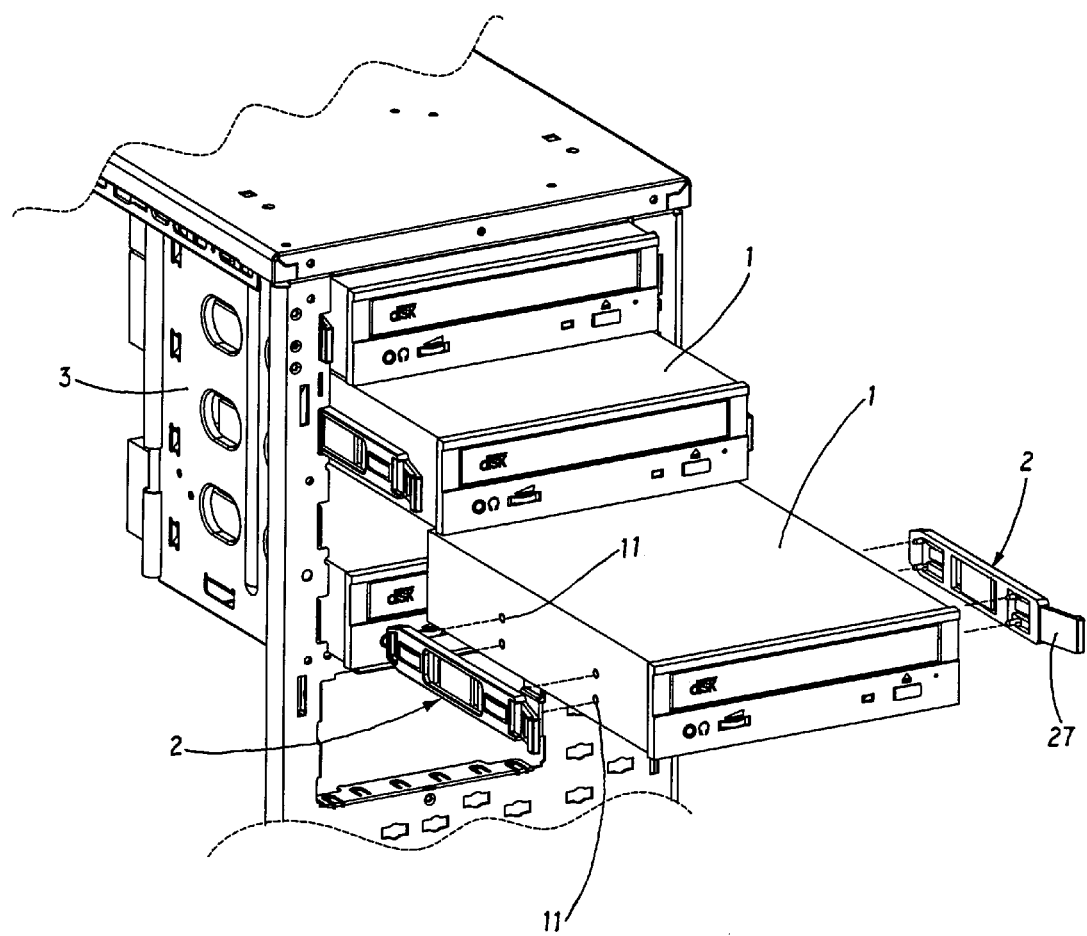
FIG. 2 is a schematic perspective view showing that the device of the first embodiment of the present invention being installed at two sides of a disk drive.
Figure 3:
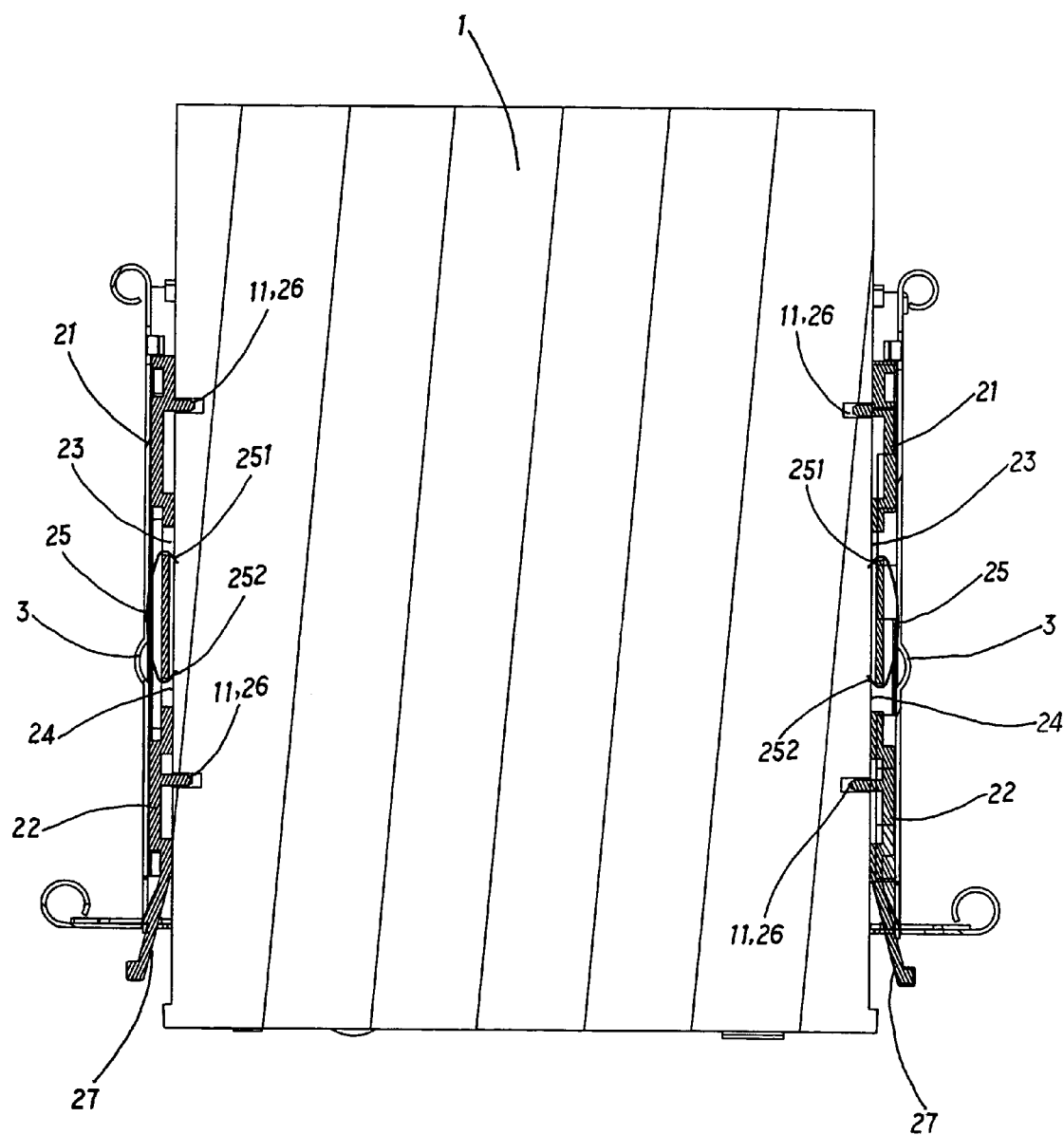
FIG. 3 is a cross section view showing that the device of FIG. 1 is installed at two side of a disk drive and then is installed in a machine frame.

With reference to FIGS. 1 to 3, a guide track device of a disk drive of the present invention is illustrated. The guide track device is installed at two sides of a disk drive (including optical disk drive and floppy disk drive) so as to position the disk drive or pull and push the disk drive.

A pair of guide tracks 2 are installed at two sides of a disk drive 1 so that the disk drive can be installed at a pair of slide grooves in a pair of machine frame 3 of a computer casing. A rear area of an outer side of each guide track is installed with a convex cambered elastomer 21 and a front area of the outer side of each guide track is installed with a convex cambered elastomer 22. Two windows 23, 24 are formed between the two cambered elastomers 21, 22. A conductive elastic sheet 25 is a cambered plate and has two hooks 251, 252. By the two hooks 251, 252, the conductive elastic sheet 25 is buckled into the two windows 23, 24. A plurality of tenons 26 at an inner side of each guide track 2. By inserting the tenons 26 into the holes 11 at lateral sides of a disk drive, the pair of guide tracks are positioned to the disk drive 1. A front end of each guide track 2 has an ear 27. By pulling or pushing the ears 27, the disk drive 1 can be pull out from or push into the machine frame 3. Moreover, the elastomers 21, 22 will be compressed so as to deform so that the disk drive 1 resists against the inner wall of the slide grooves of the machine frame 3. An inner wall of the disk drive 1 will resist against and push outwards the conductive elastic sheet 25 so that the conductive elastic sheet 25 resists against the inner wall of the slide groove. Thereby, the disk drive 1 is grounded to the machine frame 3.

The guide track is made of plastic. A front end of each guide track has a taper shape.

Figure 4:
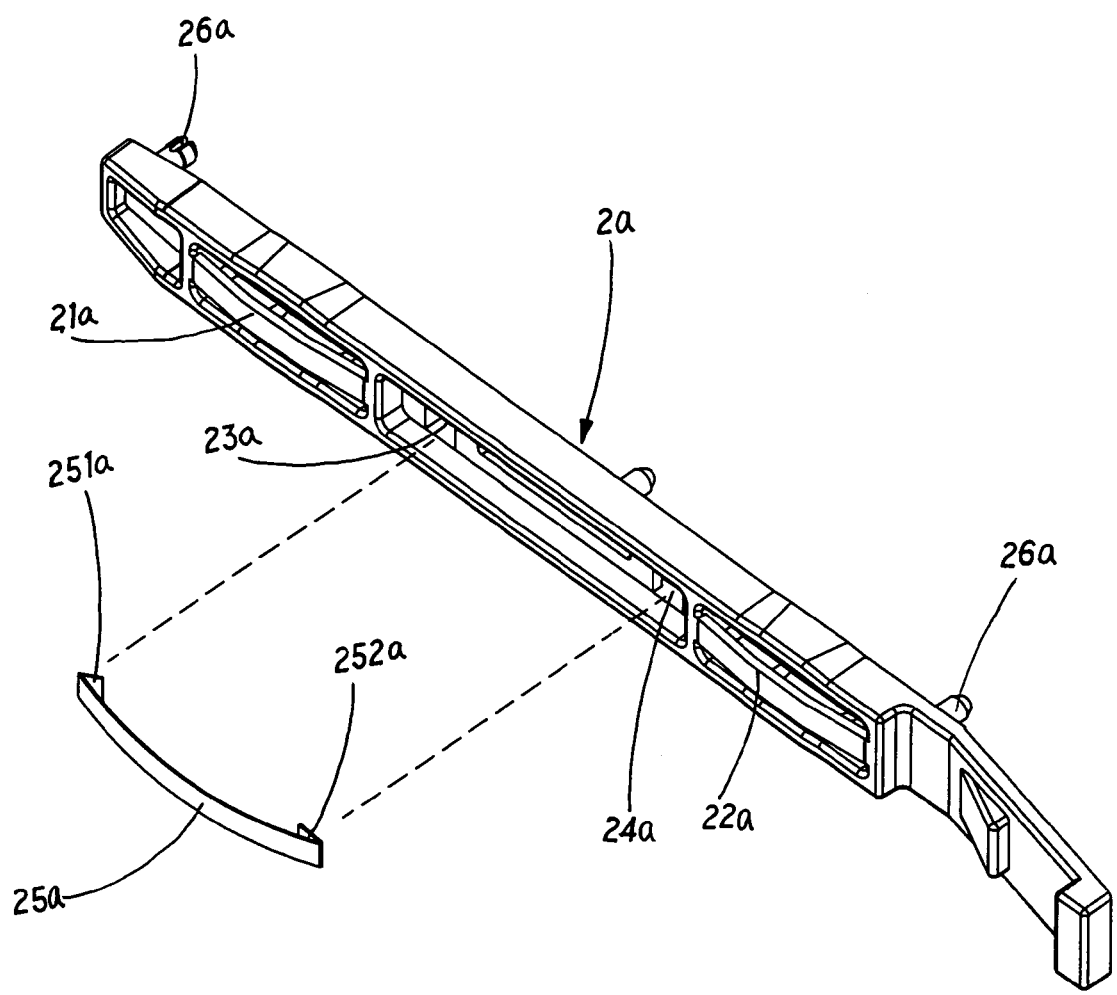
FIG. 4 is a perspective view of the second embodiment of the present invention.
Figure 5:
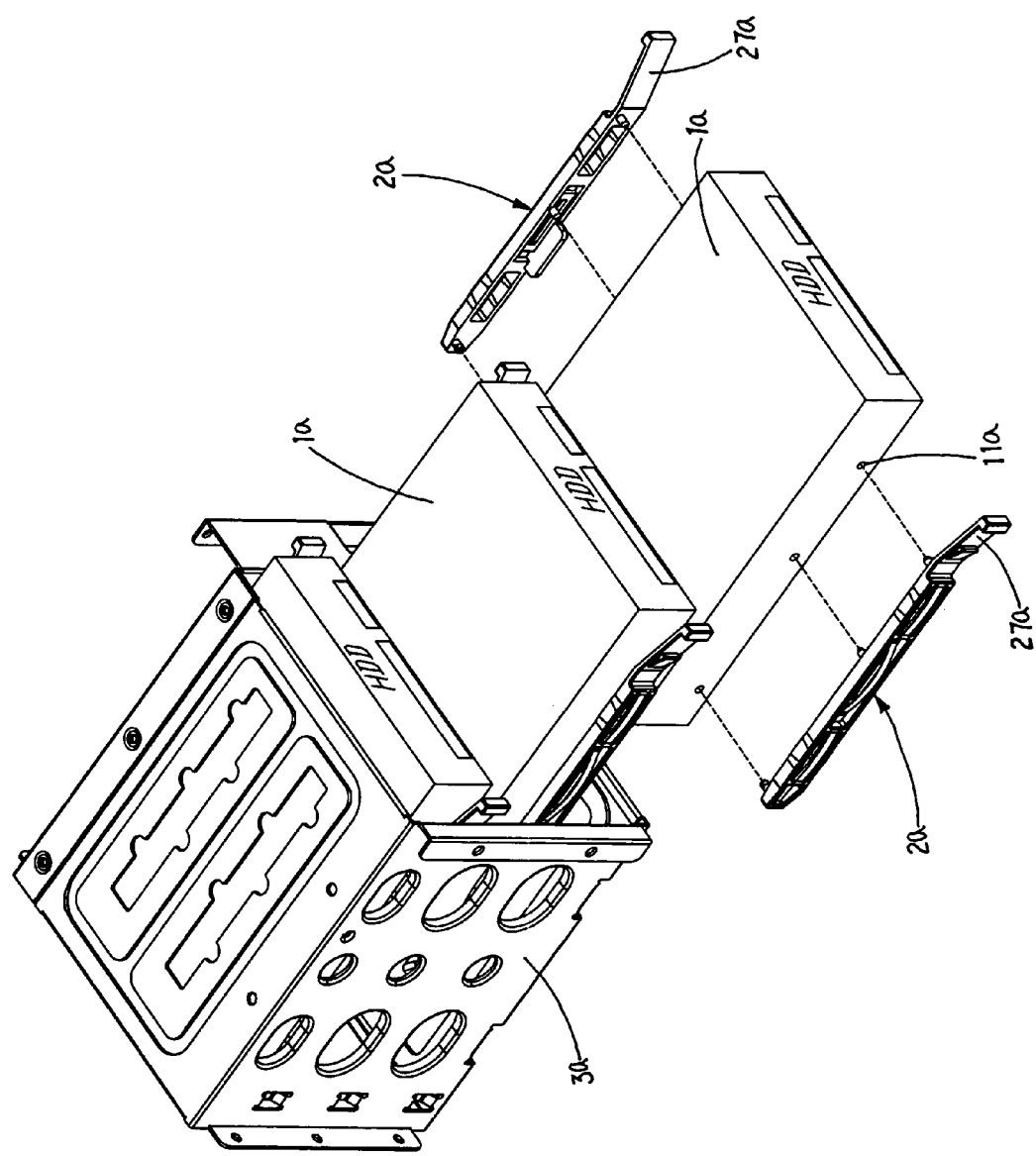
FIG. 5 is a schematic perspective view of the device in FIG. 4, where it is installed at two sides of a disk drive.
Figure 6:
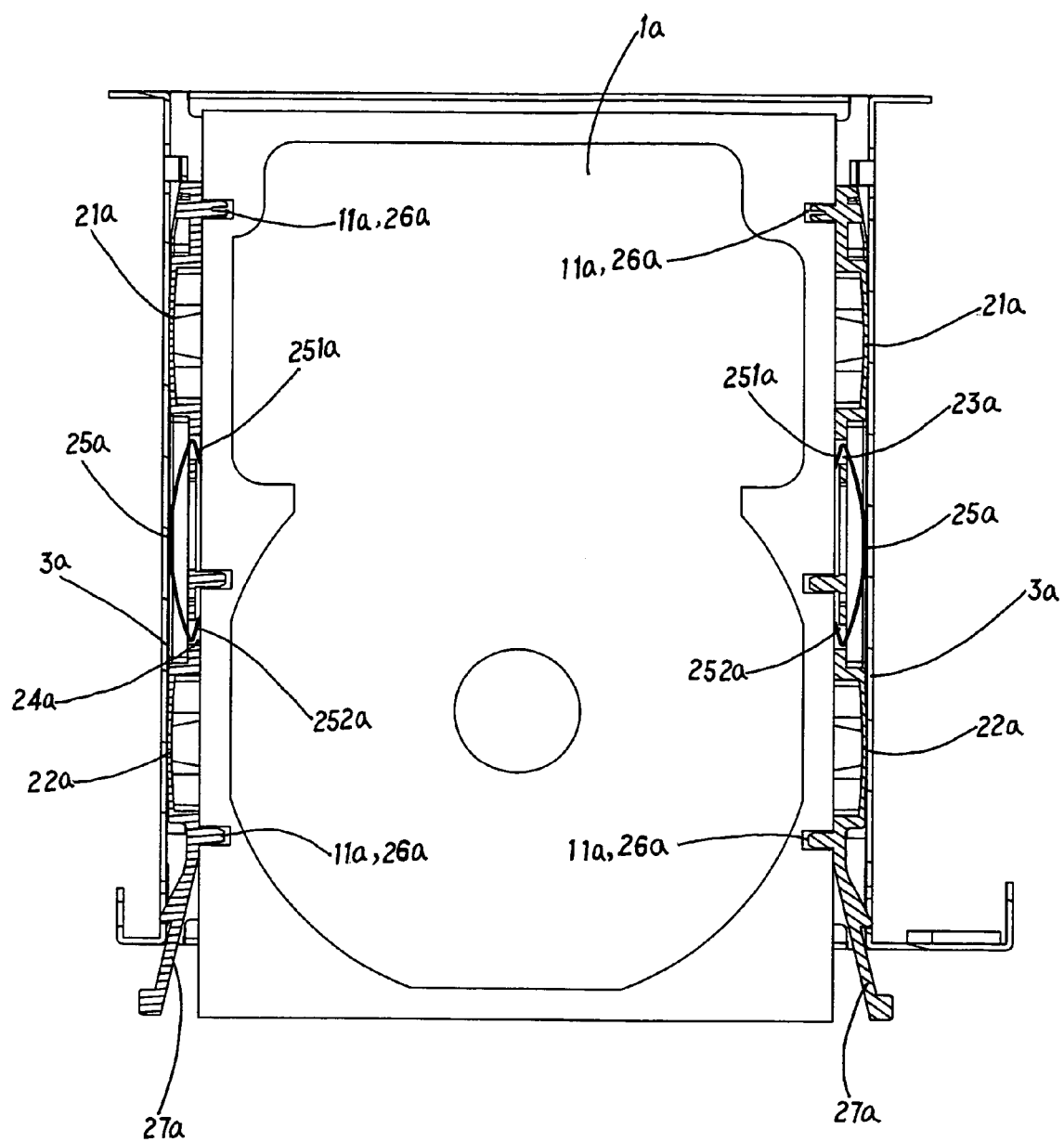
FIG. 6 is a cross section view showing that the device of FIG. 4 is installed at two side of a disk drive and then is installed in a machine frame.
Figure 7:
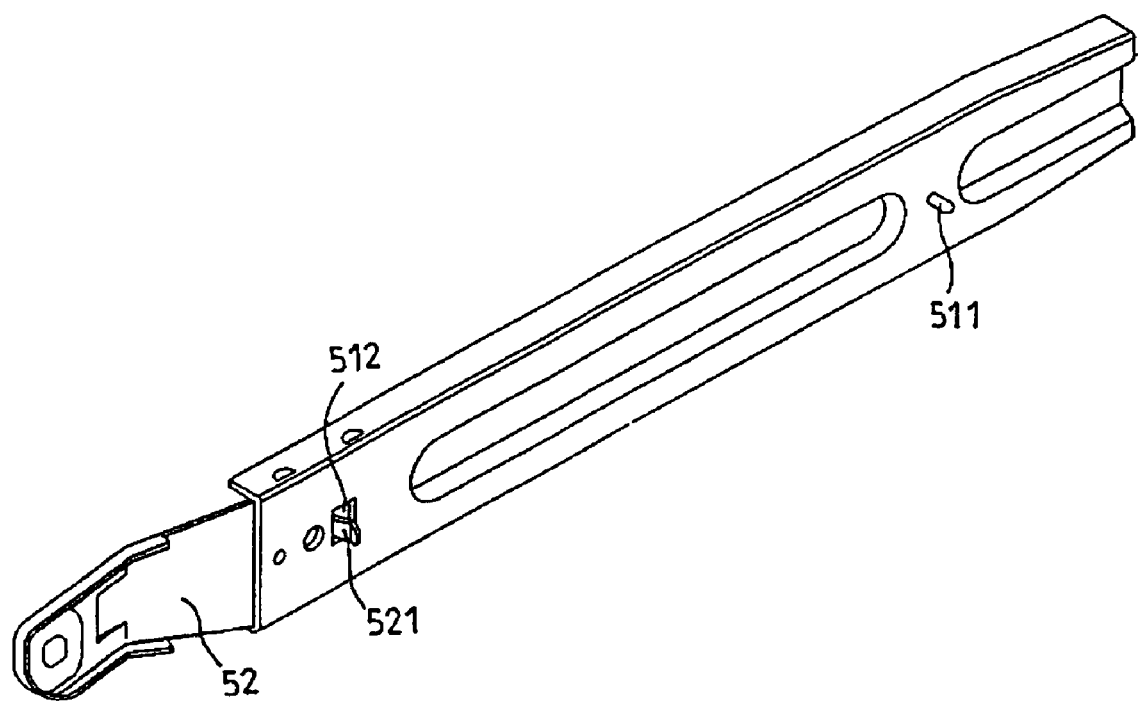
FIG. 7 is a perspective view of the prior art sliding track frame.
Figure 8:
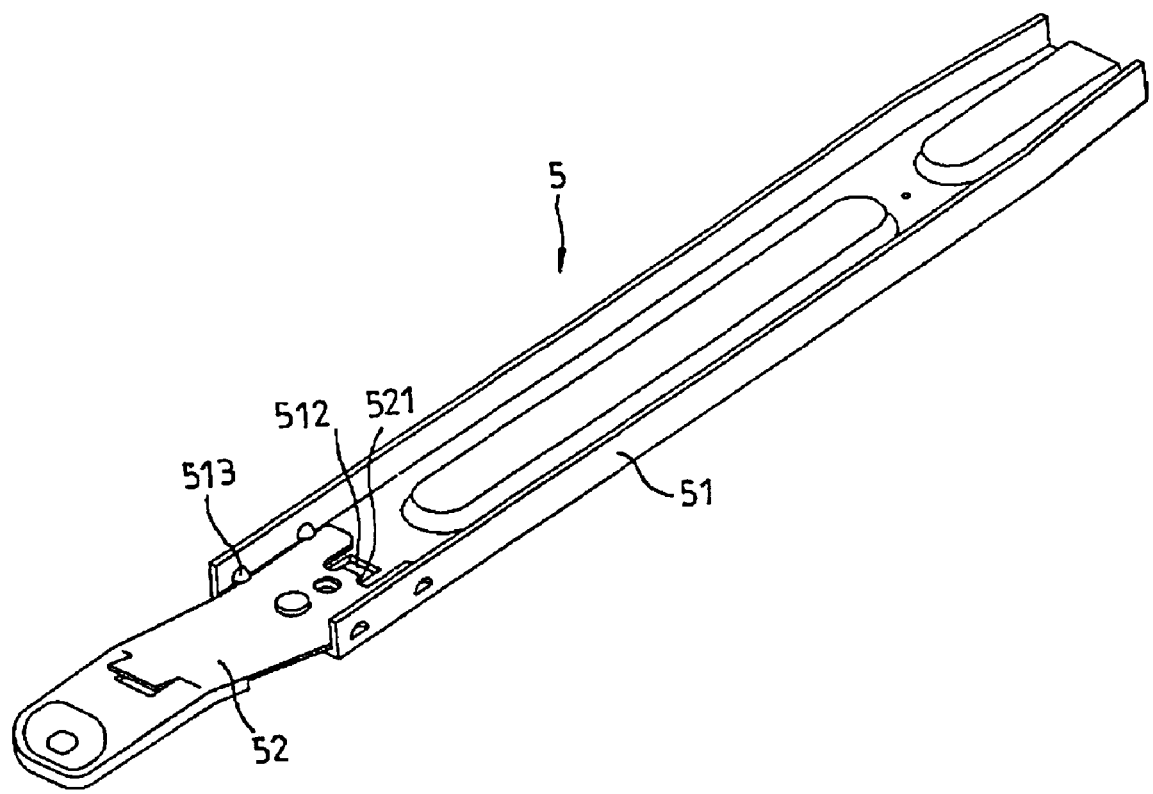
FIG. 8 is a perspective view of the prior art slide track frame at another orientation.

Referring to FIGS. 4 to 6, the second embodiment of the present invention is illustrated. The second embodiment is identical to the second embodiment, except that the height of the guide track 2a is reduced so as to match the height of the disk drive 1a. It is shown that the guide tracks are installed at two sides of the disk drive 1a. A rear and front areas of an outer side of each guide track are installed with outward convex eastomers 21a, 22a and two windows 23a, 24a. A conductive elastic sheet 25a is made of cambered metal plate. The conductive elastic sheet 25a has two hooks 251a, 252a at two ends thereof. By the hooks 251a, 252a to buckle with the windows 23a, 24a, the conductive elastic sheet 25a are combined to the guide tracks. A plurality of tenons 26a at an inner side of each guide track 2a are enforced into holes 22a of the disk drive 1a. The guide track 1 is positioned to the disk drive 1a. Each of the guide track 2a is formed with an ear 27s for pushing or pulling the disk drive 1a into the machine frame 3a so that the disk drive 1a will ground to the machine frame 3a.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A guide track device of a disk drive; the guide track device being installed at two sides of a disk drive; and then the guide tracks being installed at two slide grooves at a pair of machine frames of a computer casing so as to position the disk drive or pull and push the disk drive; each guide track device comprising:

a first convex cambered elastomer installed at a rear area of an outer side of each guide track and a second convex cambered elastomer installed at a front area of the outer side of each guide track;

two windows being formed between the two cambered elastomers;

a conductive elastic sheet; the conductive elastic sheet being a cambered plate and having two hooks; by the two hooks, the conductive elastic sheet being buckled into the two windows; a plurality of tenons at an inner side of each guide track; by inserting the tenons into the holes at lateral sides of a disk drive, the pair of guide tracks being positioned to the disk drive; and an ear at a front end of each guide track; by pulling or pushing the ears, the disk drive can be pull out from or push into the machine frame.

2. The guide track device of a disk drive as claimed in claim 1, wherein the guide track is made of plastic.

3. The guide track device of a disk drive as claimed in claim 1, wherein a front end of each guide track has a taper shape.

4. The guide track device of a disk drive as claimed in claim 1, wherein the disk drive is an optic disk drive.

5. The guide track device of a disk drive as claimed in claim 1, wherein the disk drive is a floppy disk drive.

* * * * *